US010936905B2

(12) United States Patent
Singh et al.

(10) Patent No.: US 10,936,905 B2
(45) Date of Patent: Mar. 2, 2021

(54) METHOD AND SYSTEM FOR AUTOMATIC OBJECT ANNOTATION USING DEEP NETWORK

(71) Applicant: Tata Consultancy Services Limited, Mumbai (IN)

(72) Inventors: Chandan Kumar Singh, Noida (IN); Anima Majumder, Bangalore (IN); Swagat Kumar, Bangalore (IN); Laxmidhar Behera, Kanpur (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 125 days.

(21) Appl. No.: 16/504,095

(22) Filed: Jul. 5, 2019

(65) Prior Publication Data

US 2020/0193222 A1 Jun. 18, 2020

(30) Foreign Application Priority Data

Jul. 6, 2018 (IN) .............................. 201821025354

(51) Int. Cl.
*G06K 9/00* (2006.01)
*G06K 9/62* (2006.01)
(Continued)

(52) U.S. Cl.
CPC ........... *G06K 9/6255* (2013.01); *G06K 9/628* (2013.01); *G06K 9/6228* (2013.01);
(Continued)

(58) Field of Classification Search
CPC .... G06K 9/6255; G06K 9/6228; G06K 9/628; G06K 9/66; G06K 9/4628; G06K 9/6272;
(Continued)

(56) References Cited

U.S. PATENT DOCUMENTS 6,339,431 B1 * 1/2002 Ohmori ................. G06F 3/0481
345/585
7,894,647 B2 * 2/2011 Zhou ................... G06K 9/6209
382/128
(Continued)

FOREIGN PATENT DOCUMENTS

CN 103823845 A 5/2014

OTHER PUBLICATIONS

Cho et al., "face detection in nighttime images using visible light camera sensors with two-step faster Region-Based convolutional Neural Network", Jul. 31, 2018; pp. 1-31.*
(Continued)

*Primary Examiner* — Amir Alavi
(74) *Attorney, Agent, or Firm* — Finnegan, Henderson, Farabow, Garrett & Dunner, LLP

(57) ABSTRACT

Object annotation is images is tedious time consuming task when large volume of data needs to annotated. Existing methods limit to semiautomatic approaches for annotation. The embodiments herein provide a method and system for a deep network based architecture for automatic object annotation. The deep network utilized is a two stage network with first stage as an annotation model comprising a Faster Region-based Fully Convolutional Networks (F-RCNN) and Region-based Fully Convolutional Networks (RFCN) providing for two class classification to generate annotated images from a set of single object test images. Further, the newly annotated test object images are then used to synthetically generate cluttered images and their corresponding annotations, which are used to train the second stage of the deep network comprising the multi-class object detection/classification model designed using the F-RCNN and the RFCN as base networks to automatically annotate input test image in real time.

12 Claims, 14 Drawing Sheets

(51) Int. Cl.
  *G06N 3/04* (2006.01)
  *G06N 3/08* (2006.01)
  *G06T 3/00* (2006.01)

(52) U.S. Cl.
  CPC .............. *G06N 3/0454* (2013.01); *G06N 3/08* (2013.01); *G06T 3/0006* (2013.01)

(58) Field of Classification Search
  CPC .............. G06K 9/6281; G06K 9/00718; G06K 9/00797; G06K 9/6216; G06K 9/6254; G06N 3/08; G06N 3/0454; G06T 3/0006; H04N 7/0145; H04N 1/40062; G06F 17/30257; G06F 17/3024
  See application file for complete search history.

(56) References Cited

U.S. PATENT DOCUMENTS

| | | | | |
|---|---|---|---|---|
| 8,407,635 | B2* | 3/2013 | Chopra | G06F 30/3323 716/105 |
| 8,903,167 | B2* | 12/2014 | Kohli | G06K 9/6255 382/155 |
| 9,437,027 | B2* | 9/2016 | Isola | G06T 19/20 |
| 9,721,017 | B2* | 8/2017 | Denninghoff | H03H 9/1092 |
| 9,811,765 | B2* | 11/2017 | Wang | G06K 9/00664 |
| 9,916,522 | B2* | 3/2018 | Ros Sanchez | G06K 9/6256 |
| 10,049,308 | B1* | 8/2018 | Dhua | G06N 3/0472 |
| 10,152,655 | B2 | 12/2018 | Krishnamurthy et al. | |
| 10,860,836 | B1* | 12/2020 | Tyagi | G06N 20/00 |
| 2018/0189951 | A1* | 7/2018 | Liston | G06T 11/60 |
| 2020/0193222 | A1* | 6/2020 | Singh | G06N 3/08 |

OTHER PUBLICATIONS

Montserrat, D.M. et al. (2017). "Training Object Detection and Recognition CNN Models Using Data Augmentation," *IS&T International Symposium on Electronic Imaging* 2017, pp. 27-36.

Georgakis, G. et al. (Sep. 2017). "Synthesizing Training Data for Object Detection in Indoor Scenes," *arXiv*, 9 pages.

Tremblay, J. et al. (Apr. 2018). "Training Deep Networks with Synthetic Data: Bridging the Reality Gap by Domain Randomization," *IEEE Conference on Computer Vision and Pattern Recognition*, 9 pages.

* cited by examiner

Red background

METHOD AND SYSTEM FOR AUTOMATIC OBJECT ANNOTATION USING DEEP NETWORK

PRIORITY CLAIM

This U.S. patent application claims priority under 35 U.S.C. § 119 to: Indian application no. 201821025354, filed on Jul. 6, 2018. The entire contents of the aforementioned application are incorporated herein by reference.

TECHNICAL FIELD

The disclosure herein generally relates to object annotation, and, more particularly to automatic object annotation using deep network.

BACKGROUND

In the era of deep learning based object recognition systems, where a large number of annotated images are required for training, manual annotation of each object is a challenging job. Over the decades researchers have been mostly relying on the manual annotation techniques, using tools, like LabelMe™ or ELAN™, where each object within an image is manually labeled with a rectangular or polygonal bounding box. Such manual annotation approaches are highly tedious and time-taking jobs. They are even subject to error and often need supervision of experts while performing the job. This challenge in training data generation, has motivated many researchers to develop either completely automatic or semiautomatic data annotation techniques. To name a few, bootstrapping and active learning are state of the art among the semi-automatic annotations techniques. Bootstrapping consists of selecting hard negative samples during the learning process for better classification of classes close to the boundaries. The active learning methods comprise of annotating hard positives and hard negatives in an image. All these semi-automatic approaches suggest a probable region where the bounding box can be drawn manually, which again needs tremendous manual labor that hardly adds any significant improvement in the cost.

Warehouses is one example area, where annotation to recognize the objects is required while automating warehouse tasks. Very few works are performed in this direction. Huval et al. uses deep neural network for class generic objectness detection using Pascal VOC dataset. In a recent work Milan et al. utilizes a RefineNet architecture based semantic segmentation technique to annotate the objects. However, the segmentation accuracy in terms of F-measure is not satisfactory. Moreover, the existing method requires human intervention to correct wrongly segmented objects, thus making the approach semi-automatic. In another existing method Hemandez et al. uses depth cameras to register known object geometry to the point cloud. Thus, this existing method requires special depth sensing cameras, adding to the cost.

SUMMARY

Embodiments of the present disclosure present technological improvements as solutions to one or more of the above-mentioned technical problems recognized by the inventors in conventional systems. For example, in one embodiment, a method for automatic object annotation using deep network is provided. The method comprises receiving a manually annotated image set with each image comprising a single annotated object on a known background. Further, the method comprises generating a plurality of synthetic single object images by applying affine transformation and colour augmentation on each image from the manually annotated image set, wherein the generated plurality of synthetic single object images are annotated automatically in accordance with a corresponding manually annotated image. Further the method comprises training an annotation model for two class object detection and classification using the synthetically generated single object images and manually annotated single object images to detect a foreground Region of Interest (ROI) corresponding to the object in an image, wherein the annotation model comprises of a Faster Region-based Convolutional Neural Networks (F-RCNN) and Region-based Fully Convolutional Networks (RFCN). Furthermore, the method comprises analyzing a set of single object test images comprising unknown objects placed on the known background using the trained annotated model to generate a set of annotated images. Furthermore the method comprises synthetically generating a plurality of clutter images with corresponding annotations using the set of annotated images. Further, the method comprises utilizing the plurality of clutter images and corresponding annotations for training a multi-class object detection and classification model designed using the RCNN and the RFCN as base networks. The multi-class object detection framework annotates input test image in real time by: identifying one or more ROIs corresponding to one or more objects in the input test image and class labels associated with the one or more objects, wherein the input test image is one of an single object input image or a clutter input image, wherein each ROI is defined by a bounding box with position coordinates comprising xmin, ymin, xmax, ymax.

In another aspect, a system for automatic object annotation using deep network is provided. The system comprises a memory storing instructions; one or more Input/Output (I/O) interfaces; and processor(s) coupled to the memory via the one or more I/O interfaces, wherein the processor(s) is configured by the instructions to receive a manually annotated image set with each image comprising a single annotated object on a known background. Further, the processor (s) is configured to generate a plurality of synthetic single object images by applying affine transformation and color augmentation on each image from the manually annotated image set, wherein the generated plurality of synthetic single object images are annotated automatically in accordance with a corresponding manually annotated image. Further, the processor (s) is configured to train an annotation model for two class object detection and classification using the synthetically generated single object images and manually annotated single object images to detect a foreground Region of Interest (ROI) corresponding to the object in an image, wherein the annotation model comprises of a Faster Region-based Convolutional Neural Networks (F-RCNN) and Region-based Fully Convolutional Networks (RFCN). Further, the processor (s) is configured to analyze a set of single object test images comprising unknown objects placed on the known background using the trained annotated model to generate a set of annotated images. Furthermore, the processor (s) is configured to synthetically generate a plurality of clutter images with corresponding annotations using the set of annotated images. Furthermore, the processor (s) is configured to utilize the plurality of clutter images and corresponding annotations for training a multi-class object detection and classification model designed using the Region-based Fully Convolutional Networks (RCNN) and the Region-based Fully Convolutional Networks (RFCN) as base networks. The multi-class object detection framework annotates input test image in real time by identifying one or more ROIs corresponding to one or more objects in the input test image and class labels associated with the one or more objects, wherein the input test image is one of an single object input image or a clutter input image, wherein each ROI is defined by a bounding box with position coordinates comprising xmin, ymin, xmax, ymax.

In yet another aspect, there are provided one or more non-transitory machine readable information storage mediums comprising one or more instructions, which when executed by one or more hardware processors causes a method for automatic object annotation using deep network is provided. The method comprises receiving a manually annotated image set with each image comprising a single annotated object on a known background. Further, the method comprises generating a plurality of synthetic single object images by applying affine transformation and colour augmentation on each image from the manually annotated image set, wherein the generated plurality of synthetic single object images are annotated automatically in accordance with a corresponding manually annotated image. Further the method comprises training an annotation model for two class object detection and classification using the synthetically generated single object images and manually annotated single object images to detect a foreground Region of Interest (ROI) corresponding to the object in an image, wherein the annotation model comprises of a Faster Region-based Convolutional Neural Networks (F-RCNN) and Region-based Fully Convolutional Networks (RFCN). Furthermore, the method comprises analyzing a set of single object test images comprising unknown objects placed on the known background using the trained annotated model to generate a set of annotated images. Furthermore the method comprises synthetically generating a plurality of clutter images with corresponding annotations using the set of annotated images. Further, the method comprises utilizing the plurality of clutter images and corresponding annotations for training a multi-class object detection and classification model designed using the RCNN and the RFCN as base networks. The multi-class object detection framework annotates input test image in real time by: identifying one or more ROIs corresponding to one or more objects in the input test image and class labels associated with the one or more objects, wherein the input test image is one of an single object input image or a clutter input image, wherein each ROI is defined by a bounding box with position coordinates comprisingxmin, ymin, xmax, ymax.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
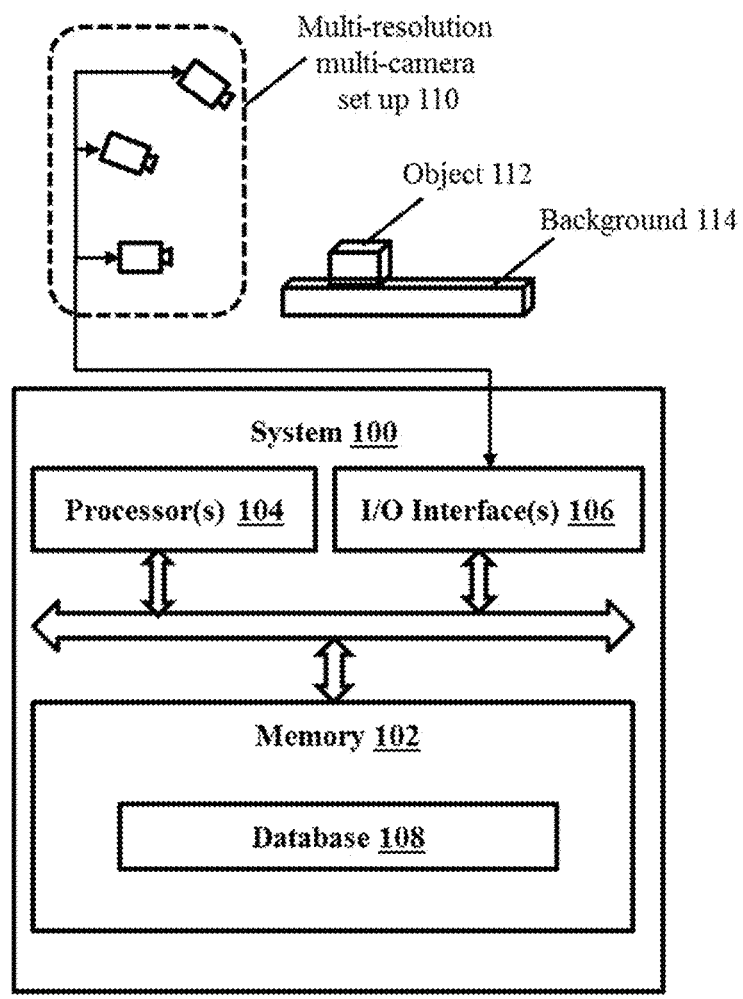
FIG. 1 is a functional block diagram of a system for automatic object annotation using a deep network, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments herein provide a method and system for a deep network based architecture for training a deep network model for automatic object annotation. The deep network utilized is a two stage network comprising a two class classification model, referred as an annotation model and a multi-class object detection and classification model. The first stage is an annotation model comprising a Faster Region-based Fully Convolutional Networks (F-RCNN) and Region-based Fully Convolutional Networks (RFCN) providing for two class classification to generate annotated images from a set of single object test images, which are entirely new objects unknown to the annotation model. The annotation model is trained using system generated synthetic single object images and manually annotated single object images. The contribution of the annotation model lies in its ability to detect (annotate) any new object placed in a familiar background.

Further, the newly annotated test object images are then used to synthetically generate cluttered images and their corresponding annotations. The synthetically generated cluttered images along-with their annotations are used to train the second stage of the deep network comprising the multi-class object detection/classification model designed using the F-RCNN and the RFCN as base networks to automatically annotate input test image in real time.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

FIG. 1 is a functional block diagram of a system for automatic object annotation using a deep network, in accordance with some embodiments of the present disclosure.

In an embodiment, the system 100 includes a processor(s) 104, communication interface device(s), alternatively referred as or input/output (I/O) interface(s) 106, and one or more data storage devices or memory 102 operatively coupled to the processor(s) 104. The processors(s) 104, can be one or more hardware processors. In an embodiment, the one or more hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server. The I/O interface 106 provides interface to connect with the multi-resolution multi-camera camera set up 110, which captures the various images of one or more objects 112 placed across a background 114. The images may captured as required by training phase and testing phase of the system 100.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment the memory 102 includes models of the deep network such as the annotation model comprising the Faster RCNN and the RFCN providing for two class classification to generate annotated images from a set of single object test images, which are entirely new objects unknown to the annotation model. The memory 102 also includes models such as the multi-class object detection and classification model automatically annotate input test image in real time. The memory 102, may further store all captured images by the multi-camera-multi-resolution set up 112 such input image set, a plurality of synthetic single object images, synthetically generated plurality of clutter images, automatically annotated training images and test images. Thus, the memory 102 may comprise information pertaining to input(s)/output(s) of each step performed by the processor(s) 104 of the system 100 and methods of the present disclosure.

Figure 2A:
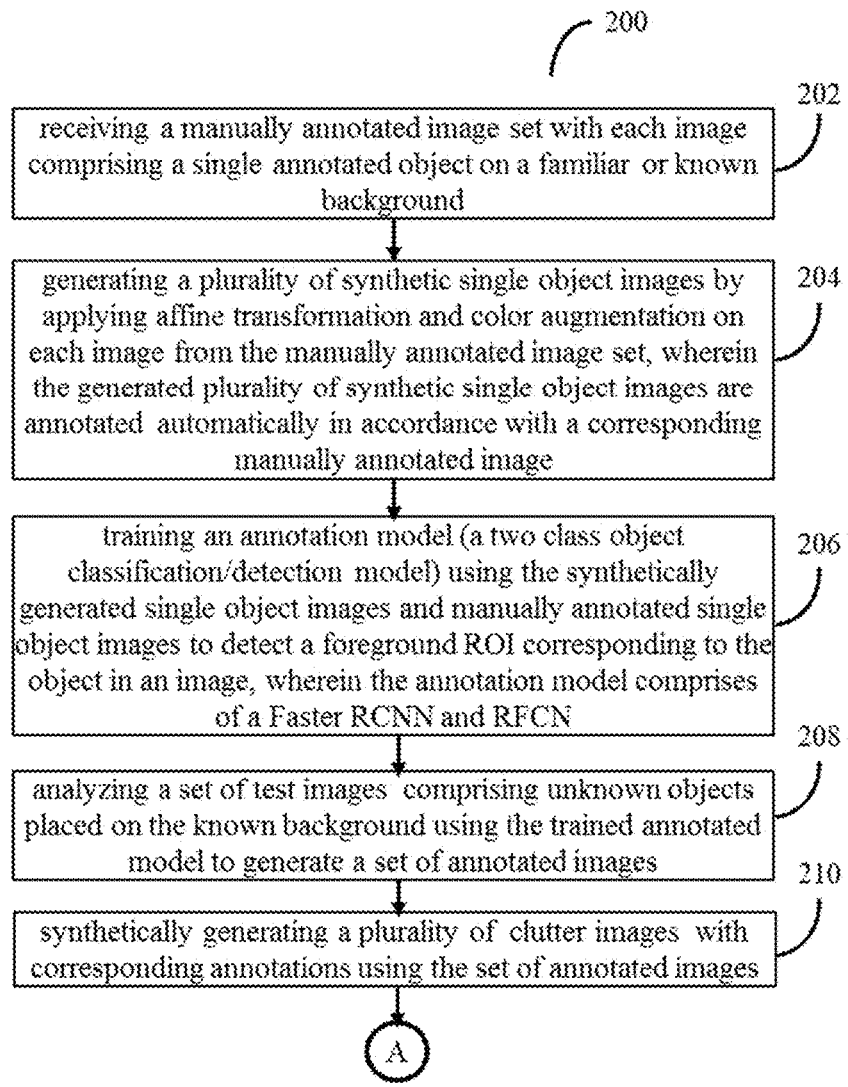
FIG. 2A and FIG. 2B is a flow diagram illustrating a method for deep network based automatic object annotation using the system of FIG. 1, in accordance with some embodiments of the present disclosure.
Figure 2B:
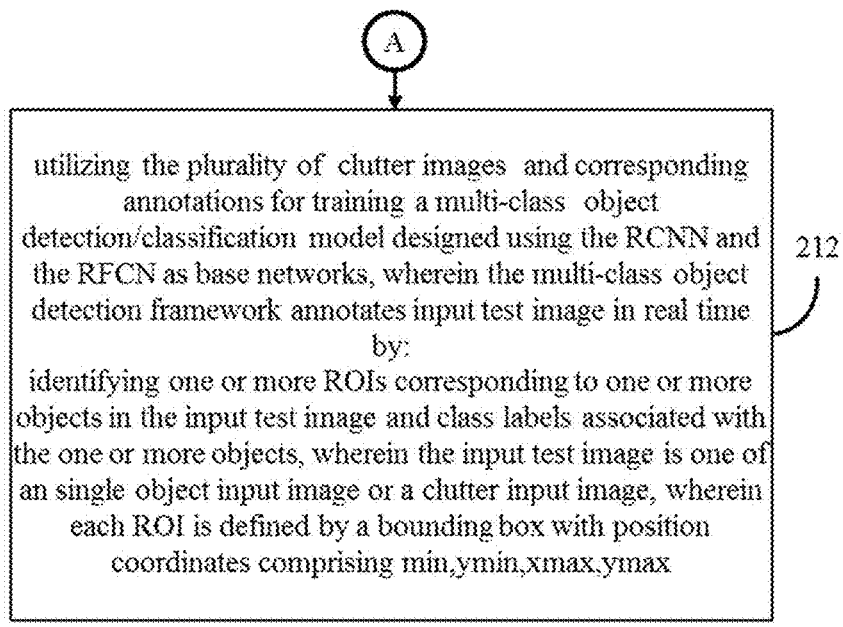
Figure 3A:
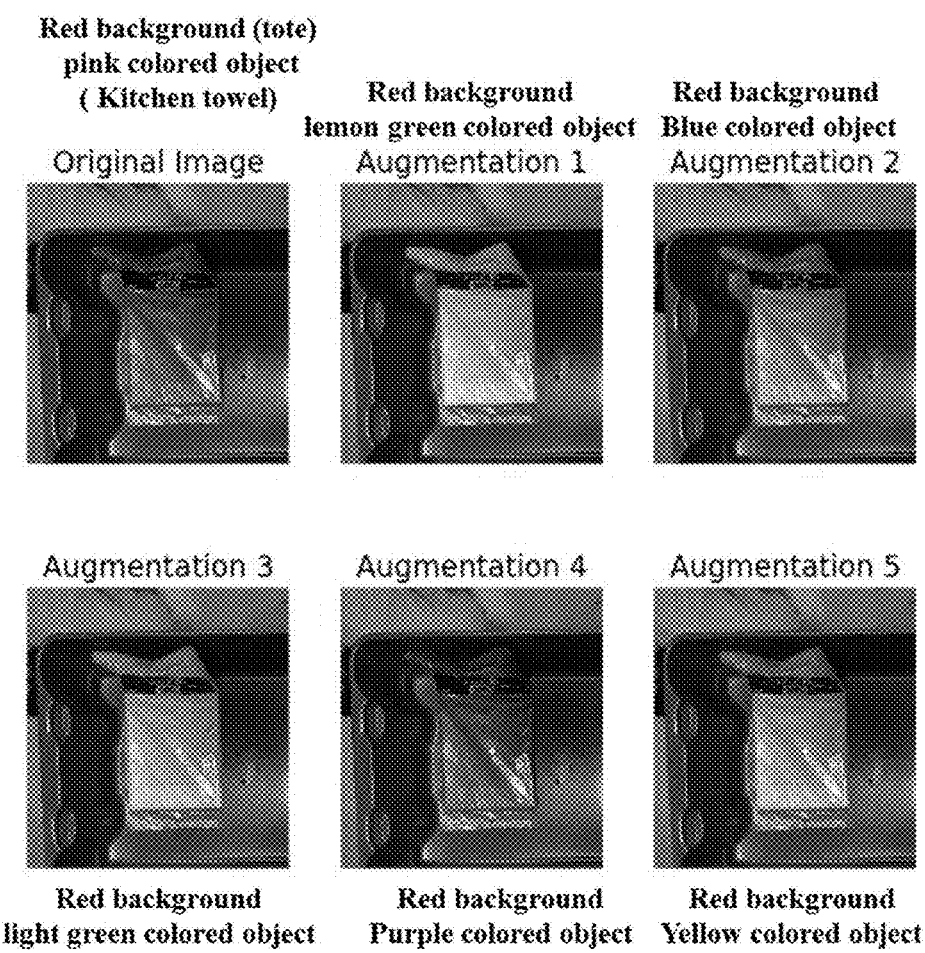
FIG. 3A through FIG. 3C illustrate example synthetic single object images generated by the system of FIG. 1 by applying affine transformation and colour augmentation on each image from a manually annotated image set, in accordance with some embodiments of the present disclosure.
Figure 3B:
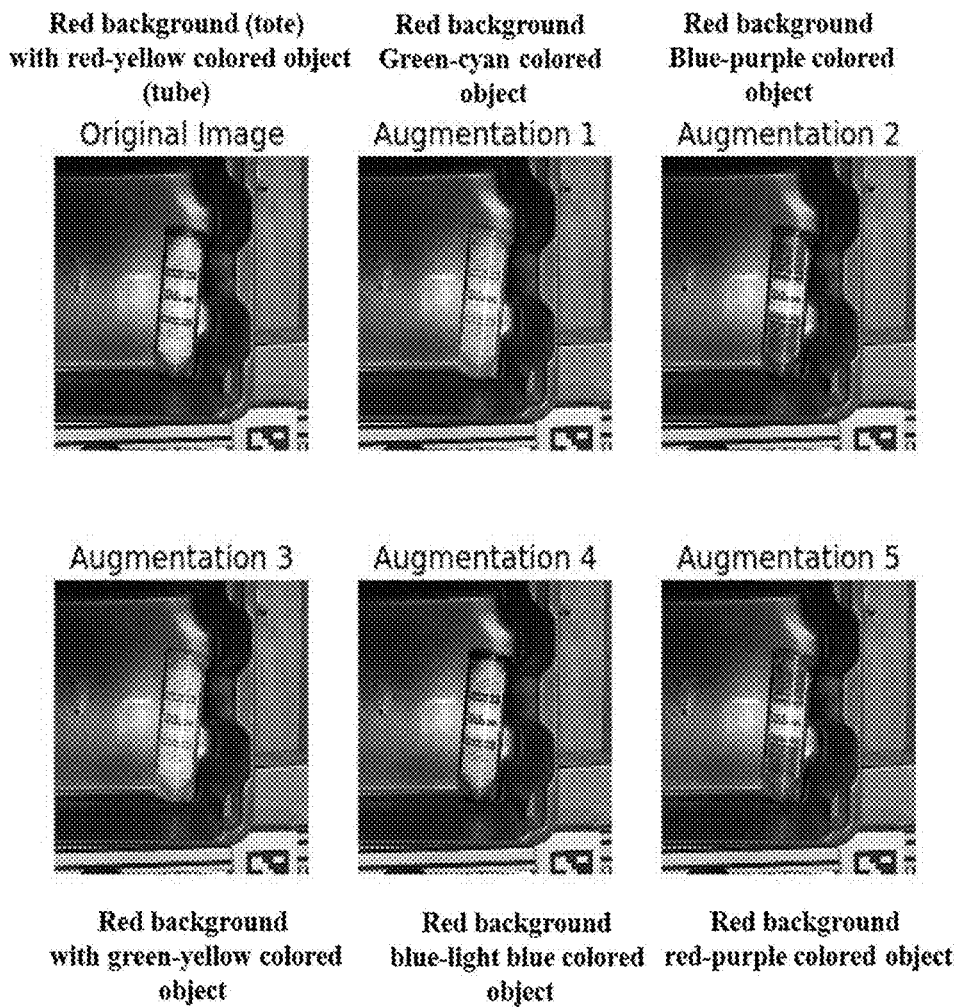
Figure 3C:
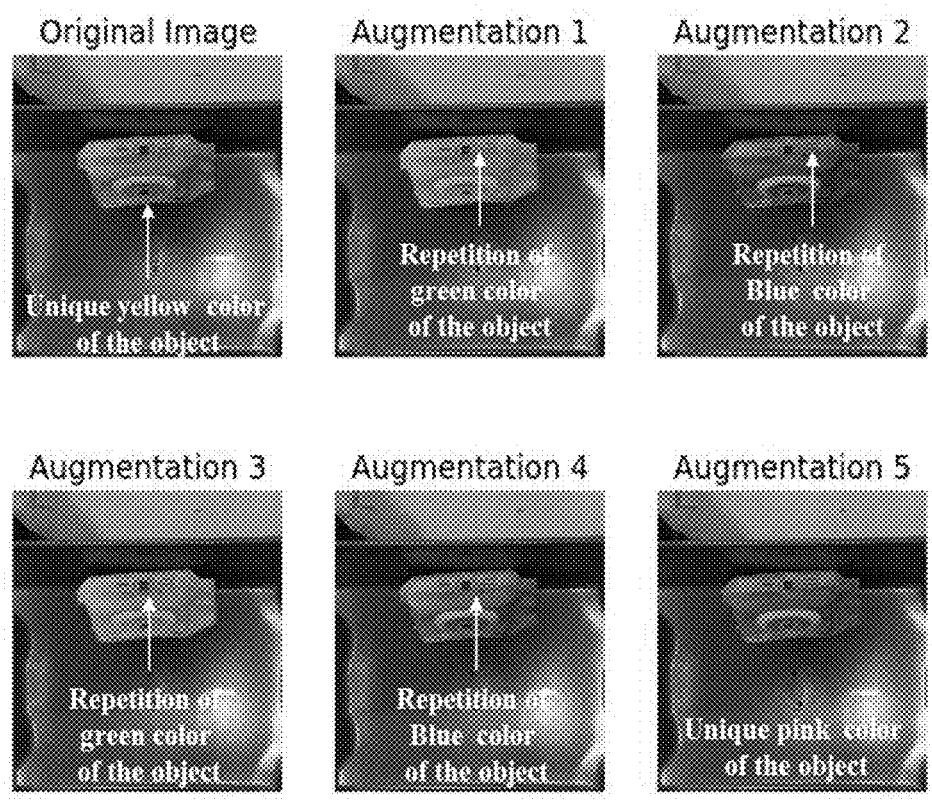

FIG. 2A and FIG. 2B is a flow diagram illustrating a method for deep network based automatic object annotation using system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor (s) 104. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Image Acquisition:

Image acquisition is performed by the multi-camera multi-resolution set up 112 prior to processing input images captured for training and testing phases of system 100 for automatic annotation of objects. In an embodiment, the multi-camera multi-resolution set up 112 comprises different cameras. An example set up combination comprises a Foscam™, Realtek™ and a webcam to capture images of the N different objects (for example N=40) at various orientations. Images with multiple resolutions, such as (800×800), (600× 600), (1320×1080), (540×480) are used in training set and testing sets. This multi-camera multi-resolution set up 112 used for images captured for the training phase enables the system 100 to detect new objects of any resolutions. The cameras are mounted on a rotating platform. Background images (where the objects are to be placed, a red colored tote in the example case depicted in drawings) are also captured at different directions. The set of N different objects are placed in the tote individually, and are captured as single object images used for training phase.

Manual Annotation:

The captured images are annotated manually to generate a training set for modeling a two-class classifier (foreground and background). For example herein, LabelMe™, a widely used software tool to annotate each image with pixel wise semantic segmentation. Each training image is thus having a corresponding annotated image containing the segmentation region of the object in the image called mask image. Thus, there are manually annotate 2000 images, alternatively referred as manually annotated image set, 50 of images from each of the 40 objects and are stored in the memory 102.

Referring to the steps of the method 200, at step 202, the processor (s) 104 is configured to receiving the manually annotated image set with each image comprising a single annotated object on a familiar or known background (red colored tote in the example case).

Referring to the steps of the method 200, at step 204, the processor (s) 104 is configured to generate a plurality of synthetic single object images by applying affine transformation and colour augmentation on each image from the manually annotated image set. The generated plurality of synthetic single object images are annotated automatically in accordance with a corresponding manually annotated image. The generation of plurality of synthetic single object images, is also referred as data augmentation.

Data Augmentation:

Augmentation of images and synthetic generation of clutters are mainly done to automatically generate sufficiently large data within a very short duration. A large size is a prime requirement for training any deep network. Another advantage of the data augmentation technique disclosed by the method is that it prevents the network from over-fitting and makes the network more generic for detecting new objects even in an unknown environment. Affine transformation also helps to generate numerous cluttered data within a very short duration when images and masks of individual objects provided.

The affine transformation is done by selecting 10 combinations of rotation (anti clockwise) using θ, scaling with λ, horizontal translation by Tx and vertical translation by Ty. It hence generates 10 new images for a given manually annotated image. The transformation matrix (H) is thus given as:

$$H = \begin{bmatrix} \lambda\cos\theta & -\lambda\sin\theta & Tx \\ \lambda\sin\theta & \lambda\cos\theta & Ty \\ 0 & 0 & 1 \end{bmatrix} \quad (1)$$

The annotation for the augmented images are generated by using affine transformation of the corresponding original image's ground truth points [xmin, ymin] and [xmax, ymax].

Color Augmentation:

Color channel augmentation is applied to every object around its Region of Interest (ROI) (obtained from the mask image). The augmentation is done by applying multiple combination of R, G, B channels. In this case 6 new Images are available for each object instances by interchanging the R, G, B channels of the mask region. Few color augmented images are demonstrated in the FIGS. 3A and 3B. Following technique as presented in the approach 1 below is used to prevent the chances of repeatability (as shown FIG. 3C). The threshold value is found empirically. It is set as 100 in most of the cases. The higher the value, the larger will be the difference among the derived images.

Approach 1:

Color augmentation technique without repeatability.
Color channel augmentation is done by interchanging R, G and B channel.
Require:
Get manually annotated dataset
while Number of object instances in the dataset do
Calculate the absolute difference between R, G, B channels at every pixel. Get the absolute differences at each pixel as _rg, _rb and _gb respectively. Find average of all the three absolute differences _rg, _rb and _gb as ravg, gavg and bavg
Set a threshold value _.
if One of the following conditions is true: ravg>_ or gavg>_ or bavg>_ then
Generate one augmentation for an object instance.
end if
if Two of the following conditions are satisfied: ravg>_ or gavg>_ or bavg>_ then
Generate two augmented image for an object instance.
else
Generate all the six augmented image for an object instance
end if
end while After applying color augmentation and affine transformation to the images containing individual objects a clutter generation approach is applied. The steps 206, 208 and 210 of the method 200 describe the clutter generation approach.

Referring to the steps of the method 200, at step 206, the processor(s) 104 is configured to train the annotation model for two class object detection and classification using the synthetically generated single object images and manually annotated single object images. The annotation model, once trained, detects a foreground ROI corresponding to the object in an image. The annotation model comprises of a Faster RCNN and RFCN. Faster RCNN and R-FCN are used to fine-tune the VGG-16 and ResNet-101 respectively.

Figure 6:
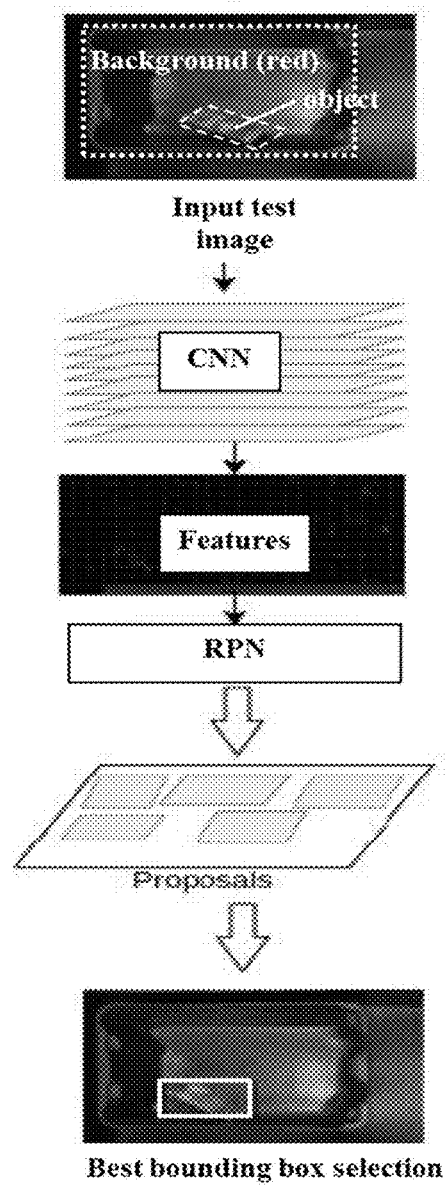
FIG. 6 depicts various stages of training of an annotation model of the system of FIG. 1, in accordance with some embodiments of the present disclosure.
Figure 7A:
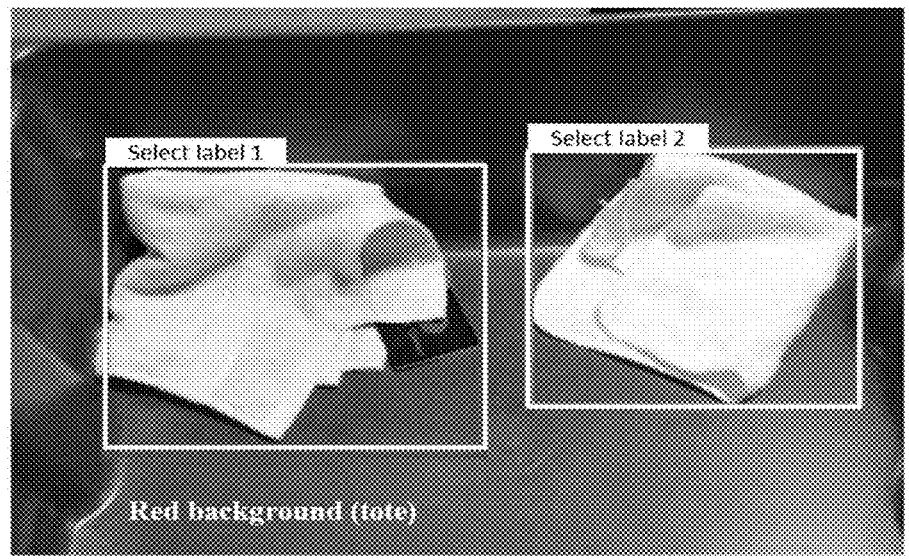
FIG. 7A, through FIG. 7D illustrate few example output images provided by the system of FIG. 1 for a clutter input image comprising objects known and unknown to the system, in accordance with some embodiments of the present disclosure.
Figure 7B:
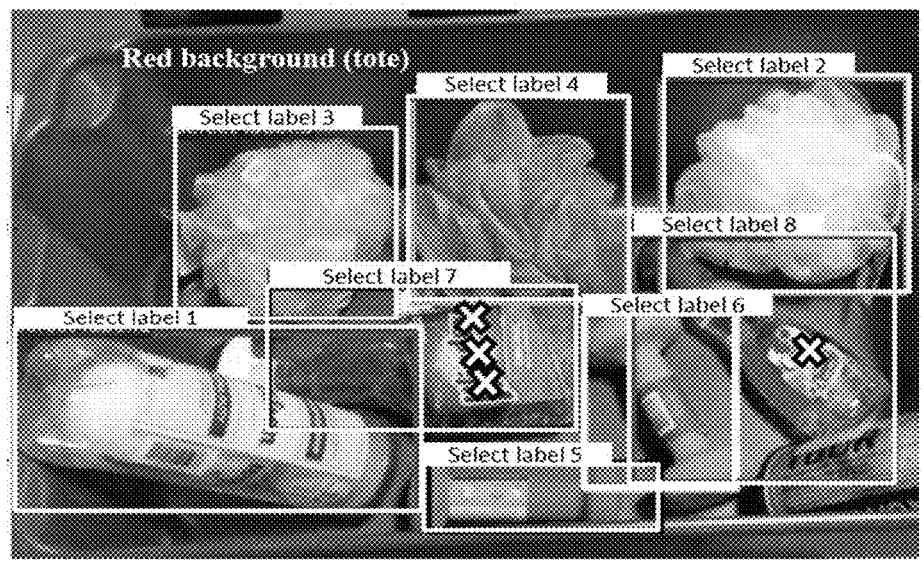
Figure 7C:
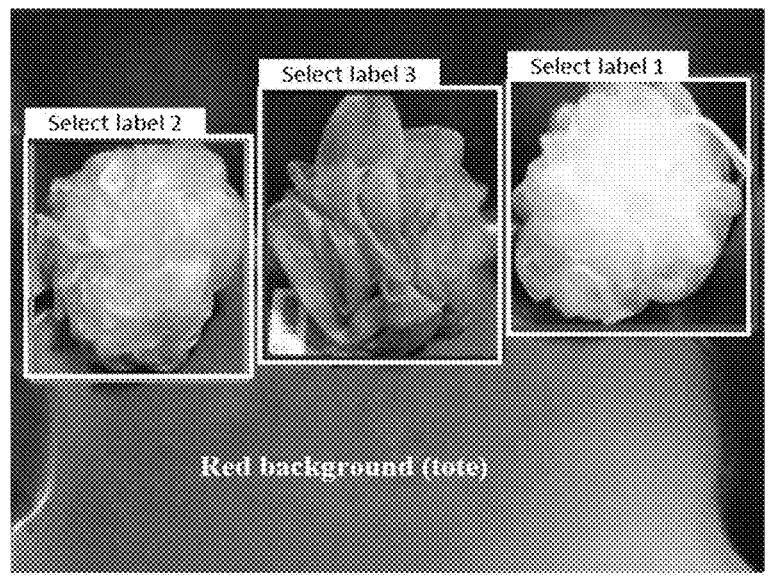
Figure 7D:
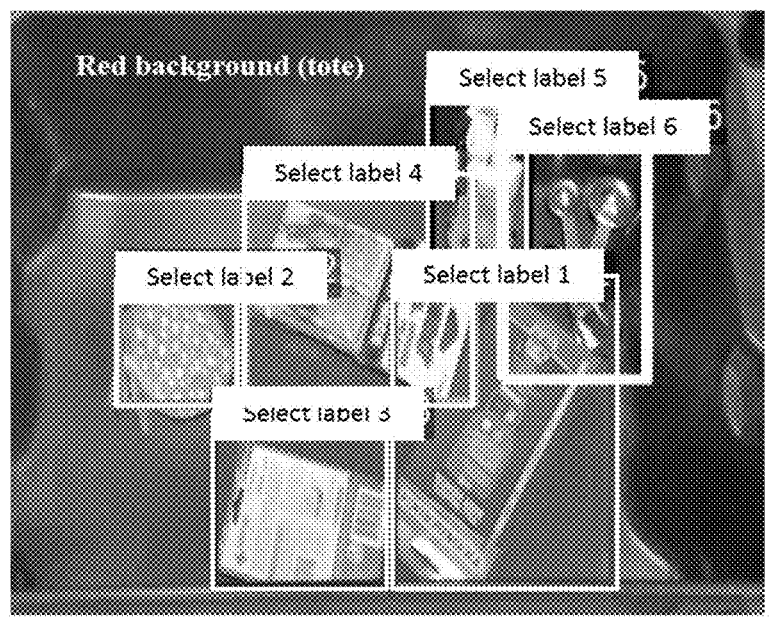

As depicted in FIG. 6 training the annotation model comprises a first training stage for creating a plurality of region proposals providing a plurality of possible foreground ROIs defined by a plurality of bounding boxes in a test image. Followed by a second training stage for identifying the foreground ROI defined by the bounding box among the plurality of possible foreground ROIs.

Figure 4:
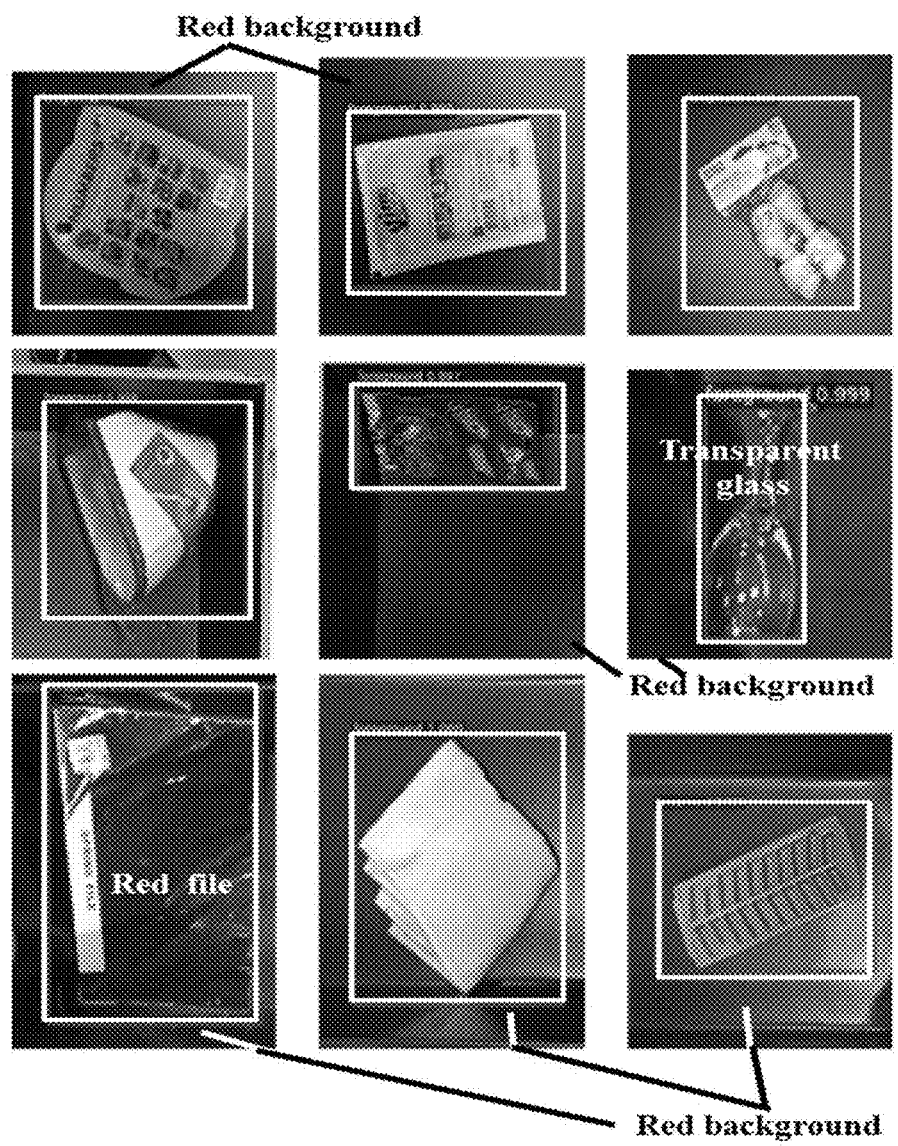
FIG. 4 illustrates a few example output images of a trained annotation model of the system of FIG. 1 providing annotated objects from new single object test images on a background known to the annotation model, in accordance with some embodiments of the present disclosure.

Referring back to the steps of the method 200, at step 208, the processor(s) 104 is configured to analyze a set of single object test images comprising unknown objects placed on the familiar or known background using the trained annotated model to generate a set of annotated images. FIG. 4 depicts automatic annotation results of few images when tested on same color background (red) using entirely new set of objects. These objects are never shown to the model previously. It can be observed that even objects like transparent glass and red color file with red background gets detected precisely.

Referring back to the steps of the method 200, at step 210, the processor(s) 104 is configured to synthetically generating a plurality of clutter images with corresponding annotations using the set of annotated images. The clutter generation technique used by the method comprises generating each clutter image on the background of interest (known, here red color tote image).

Clutter Generation:

Thus, at first step the background image is selected and divided into a plurality of grids. Thereafter, objects from the manually annotated image set and the plurality of synthetic single object images are cropped using manually generated masks. Further, the cropped objects are randomly pasted on the plurality of grids. Further, different binary values are assigned to the generated masks with for different objects in order to distinctly obtain foreground ROI in each clutter image been generated.

Figure 5A:
FIG. 5A, FIG. 5B and FIG. 5C illustrate few examples of synthetically generated clutter images by the system of FIG. with varying degree of clutter, in accordance with some embodiments of the present disclosure.
Figure 5B:
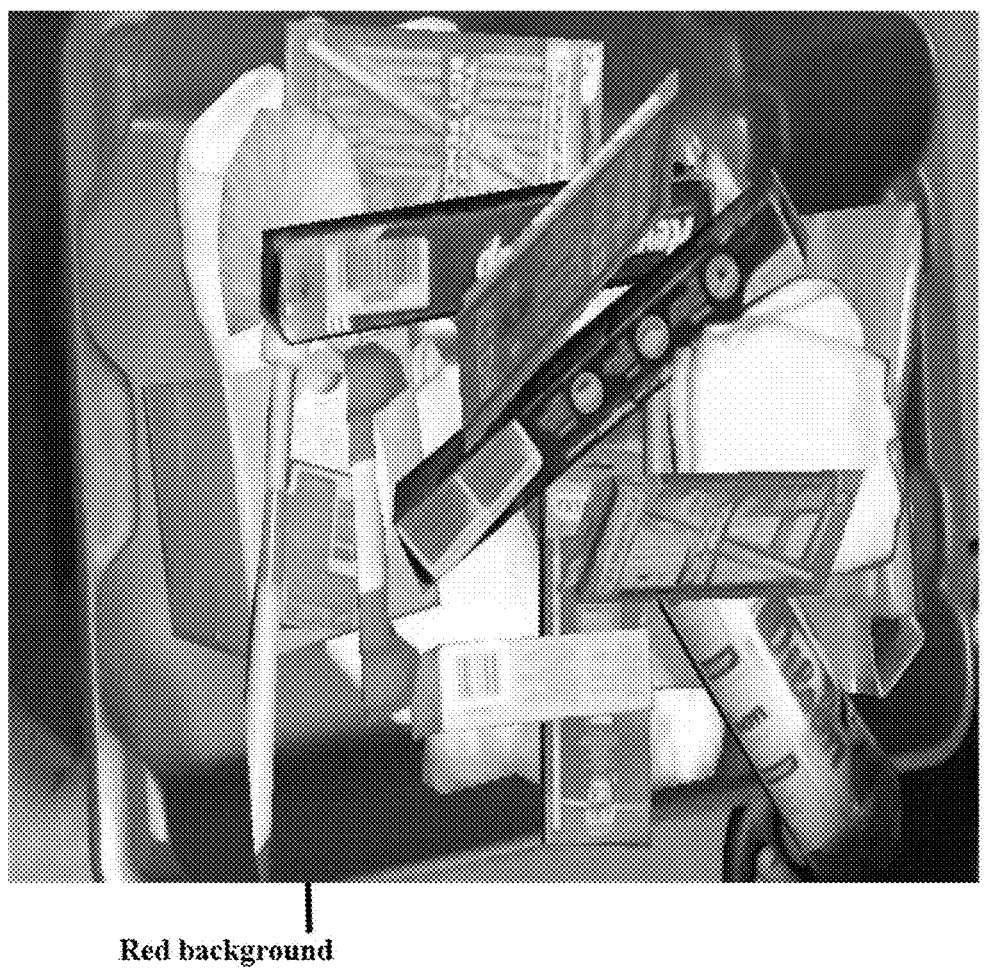
Figure 5C:
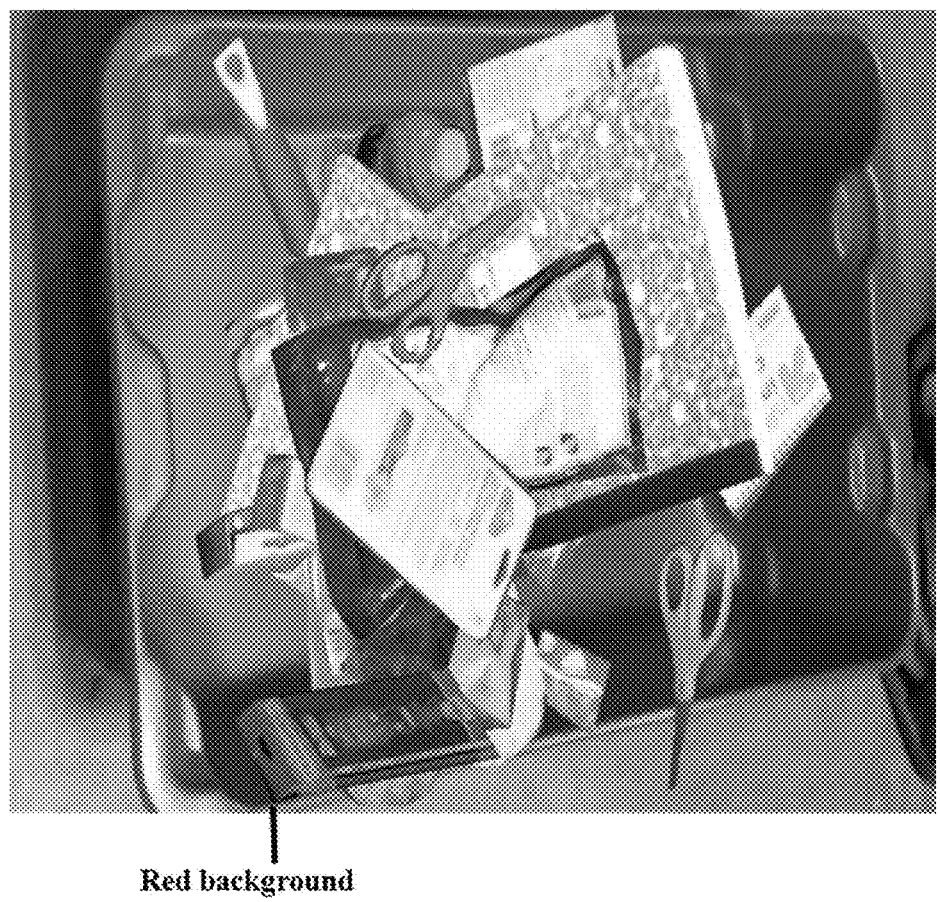

Some of the resultant clutter images with varying degree of clutter, generated after applying clutter creation technique of the method 200, are shown in the FIG. 5A, FIG. 5B and FIG. 5C. The generated clutter includes all the possible occlusion, brightness variation, orientation, scale and combination of all the 40 objects. Finally, a total of 110,000 training images comprising of 40 objects are generated after applying affine transformation and color augmentation on the 2000 manually annotated images. For each of the 40 objects 50 images were captured to maintain a balanced data distribution. The training data generation process, the label of each object in the clutters is automatically set by mapping the object image to the corresponding manually annotated image. As the number of images taken per new object is set to a fixed number, labels are set automatically to each object annotated automatically. A provision is also provided to manually set labels for each object even for objects in a cluttered environment.

Referring to the steps of the method 200, at step 212, the processor(s) 104 is configured to utilizing the plurality of clutter images and corresponding annotations for training the multi-class object detection and/classification model designed using the RCNN and the RFCN as base networks. The multi-class object detection framework annotates input test image in real time by identifying one or more ROIs corresponding to one or more objects in the input test image and class labels associated with the one or more objects The input test image can be one of an single object input image or a clutter input image, wherein each detected ROI is defined by a bounding box with position coordinates comprising xmin, ymin, xmax, ymax. Pre-trained models Vgg16 and RestNet-101 are used for Faster RCNN (F-RCNN) and RFCN respectively.

FIG. 7A through 7D depict few example images of the automatic ground truth detection results when objects are placed in varying degree of clutters. The annotation model detects ROI and end-user is given provision to write a label on each detected ROI for further categorization of objects. The clutters contain both known set of objects as well as unknown objects.

Figure 8:
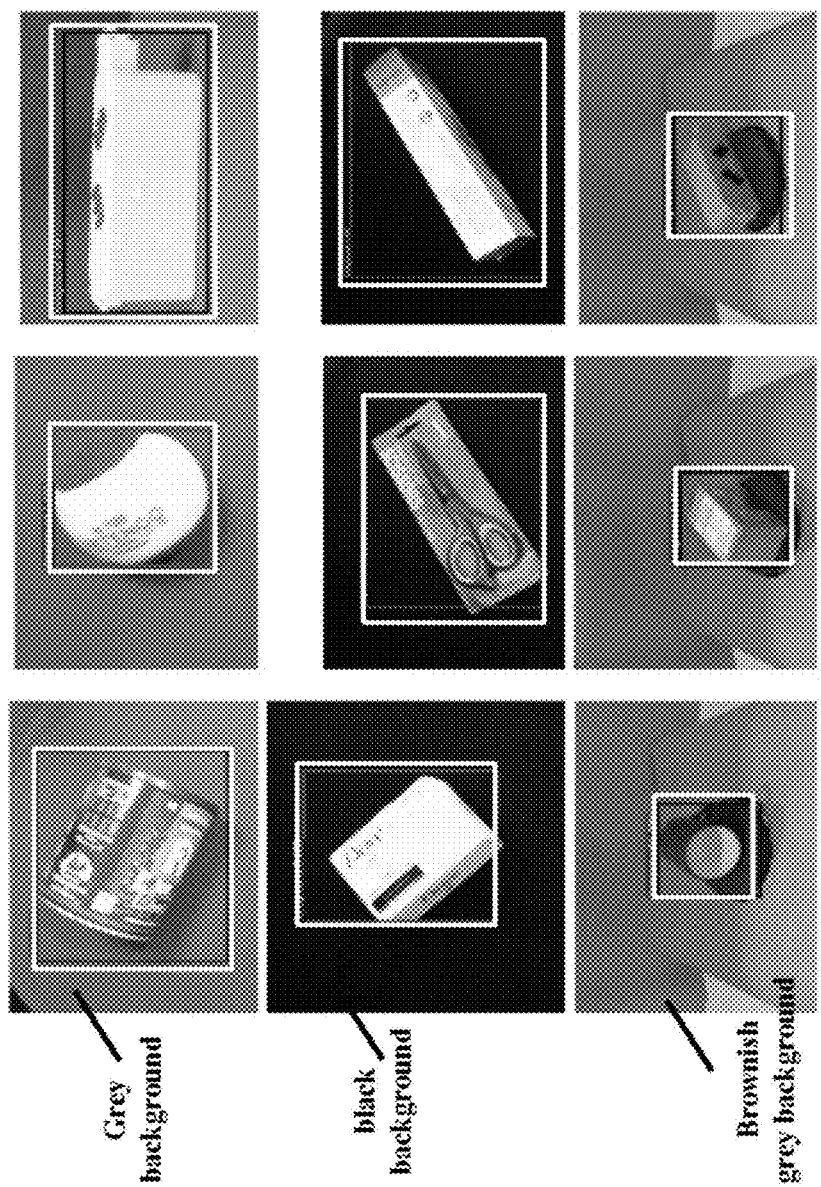
FIG. 8 illustrates few example output images of the trained annotation model of the system of FIG. 1 providing annotated objects from new single object test images on a varying background, unknown to the annotation model, in accordance with some embodiments of the present disclosure.

The proposed network is designed to completely align with the environment of warehouses, where objects and background are different. We have tested the images with multiple background color to validate the network performances. The model is still able to successfully detect the ROIs with significantly high mean Average Precision (mAP) even in different background (other than red which was used for training). Some of those test results are shown in the FIG. 8, which depicts automatic annotation results of few images when tested on different background using entirely new set of objects. The manually annotated images used for training contains only red background. Also the test objects are never shown to the model previously. Such detection is made possible by using color augmentation for background images. Further experiments are conducted by augmenting new set of training data with different background. This is done by pasting masks of the manually annotated object images on different color backgrounds. Table I gives an overall summary of the experimental results. Five different sets are used to validate the annotation performance of the proposed approaches. The performances are given in terms of mean Average Precision (mAP) which is standardized by Pascal VOC. The observation shows that, the performance of the proposed ResNet-101 model is slightly higher than the Faster-RCNN based technique. However, the training time of the former is comparatively much higher than the later approach. User can choose any of the network based on.

TABLE I below provides test results for new set of objects with multiple backgrounds. Brown (1) stands for set of object images taken using rotating platform and Brown (2) stands for the test set images taken from rack. The third column shows number of images in each of the test set, fourth column gives corresponding count of new objects. Mean average Precision (mAP) for both Faster RCNN (F-RCNN) and RFCN based approaches are presented for the given test sets. Training has been done in two steps: first using object images with Red background only. The second part uses augmented background. BG stands for background.

TABLE 1

| Test set | Set BG | # images | # objects | mAP % (trained with Red BG) F-RCNN (VGG16) | mAP % (trained with Red BG) RFCN (Res-NET-101) | mAP % (trained with augmented BG) F-RCNN (VGG16) | mAP % (trained with augmented BG) RFCN (Res-NET-101) |
|---|---|---|---|---|---|---|---|
| 1 | Brwn1 | 1760 | 13 | 38.62 | 40.14 | 92.34 | 94.36 |
| 2 | Brwn2 | 3855 | 23 | 21.38 | 26.42 | 70.34 | 73.12 |
| 3 | Blck1 | 6000 | 23 | 58.69 | 64.38 | 96.12 | 98.65 |
| 4 | Wht1 | 5880 | 23 | 41.21 | 46.43 | 96.05 | 96.78 |
| 5 | Red1 | 24900 | 83 | 98.96 | 99.05 | | |

The method achieves a mean Average Precision (mAP) of 99.19% is by using F-RCNN based multi-class object detector and a mAP of 99.61% is achieved with RFCN based network. However, training time of the later approach is much higher than its previous counterpart. To train the model, used is a single GPU machine (Quadro M5000M). Training the entire dataset of size 110,000 takes around 8 hours for F-RCNN and approximately 13 hours for RFCN based network. The precision values of individual objects when tested with new set of data equivalent to 20% of the training data size is presented in the Table II below. The observations show that, the performance of the multiclass detection results are higher than that of the binary class detection task. In multi-class detection, we have used different instances of test objects from the same class, whereas in-case Thus, the proposed object annotation approach based on deep learning networks. Faster RCNN with pre-trained models VGG-16 and RFCN with ResNet-101 are fine-tuned to classify objects into either foreground or background. The system addresses one of the main challenges in today's deep learning based object recognition techniques where annotated data of large size is the prime requirement. Introduction of color augmentation and other augmentation approaches, like affine transformation helped to generate an unbiased dataset of significantly large size (almost ten-fold of the manually annotated images) needed for training the proposed binary class detectors. The performance of the proposed approaches through various experimental results are described and it has been observed that, the proposed automatic annotation approach is very efficient in detecting any unknown objects even in an unknown environment. Robustness of the model to any new object has been demonstrated with foreground detection results when tested on entirely new object sets. The model is also proven to be robust to images of any camera resolutions and different lighting conditions. Clutter generation technique used in this paper enables the network to detect an object with densely populated environment. This is a significant contribution towards automatic annotation as it can drastically reduce the manual labor for object annotation in clutters. The performance of the proposed architectures is validated by using an automatically generated dataset for detection of multi-class objects. Objects of 83 different classes (as shown in table 2 below) are used for this purpose. The recognition performances on manually annotated validation set show the proficiency of the proposed annotation approach. The proposed approach has a great impact on warehouse applications, such as object category recognition and instances recognition. These analyses also conclude that, the model has learned the backgrounds so effectively that any alien object falls on any backgrounds in an unconstrained environment get automatically detected with high precision. The proposed annotation approach is framed to generate a rectangular ROI around each object, but will not able to generate a segmented object region using the given architecture. In order to get the exact contour of an object, this system can be extended by applying pixel-wise semantic segmentation techniques, like Mask RCNN or PSPNet in place of Faster-RCNN/RFCN. However, such approaches are subjected to be computationally more complex.

TABLE 2

| Class | Precision % (F-RCNN) | Precision % (RCNN) | Class | Precision % (F-RCNN) | Precision % (RCNN) |
|---|---|---|---|---|---|
| allenkey-set | 100 | 100 | robot-dvd | 98.17 | 100 |
| augmentedReality-book | 100 | 100 | saffola-salt | 100 | 100 |
| barbie-book | 100 | 100 | selpak-tissue | 100 | 100 |
| bisleriSmall-bottle | 95.1 | 95.35 | semanticWeb-book | 100 | 100 |
| blackCap-bottle | 97.53 | 07.67 | teddyBear-toys | 100 | 100 |
| black-ball | 100 | 100 | Tulsi-greenTea | 100 | 100 |
| black-tape | 97.53 | 99.88 | green-dumbell | 100 | 100 |
| blueCap-bottle | 96.77 | 97.5 | homefoil-aluminiumFoil | 100 | 100 |
| blueFeeding-bottle | 87.75 | 90.5 | introToRobotics-book | 100 | 100 |
| blueHandleToilet-brush | 96.29 | 100 | kiwiShoePolish-bottle | 98.05 | 97.79 |
| blue-dumbell | 100 | 100 | microfiber-clothWipes | 100 | 100 |
| blue-notebook | 100 | 97.56 | miltonBlue-bottle | 100 | 100 |
| brownBlack-TTbat | 100 | 100 | miltonSmall-bottle | 100 | 100 |
| brown-cup | 100 | 100 | multimediaOntology-book | 100 | 100 |
| camlin-colourPencil | 100 | 100 | nivea-deo | 100 | 100 |
| careTaker-swipes | 100 | 100 | origamiWhite-plates | 100 | 100 |
| circularBase-meshcup | 100 | 100 | paint-brush | 94.28 | 98.25 |
| cloth-clips | 100 | 100 | panteneShampoo-bottle | 100 | 100 |
| colgate4-toothbrushs | 100 | 100 | patanjali-toothpaste | 100 | 100 |
| colinBig-bottle | 100 | 100 | pink-scotchBite | 100 | 100 |
| deepBlue-bottle | 99.16 | 98.34 | plato-book | 100 | 100 |
| deepGreen-bottle | 98.68 | 98.67 | careTaker-napkin | 100 | 100 |
| dettol-bottle | 100 | 100 | green-battery | 100 | 100 |
| devi-coffeeBox | 100 | 100 | probablisticsRobotics-book | 100 | 100 |
| dove-soap | 100 | 100 | violet-bottle | 100 | 100 |
| fevicol-bottle | 100 | 100 | wet-wipes | 100 | 100 |
| fevikwik-tubePacket | 100 | 100 | whiteBoard-duster | 100 | 100 |
| fiama-loofa | 100 | 100 | whiteIron-brush | 99.98 | 100 |
| foundationRobotics-book | 100 | 100 | whiteVoiletCap-bottle | 100 | 100 |
| garnet-bulb | 100 | 100 | whiteWritten-cup | 100 | 100 |
| gillet-razor | 90.6 | 95.92 | whiteYellowCloth-brush | 100 | 100 |
| greenCapTransparent-bottle | 100 | 100 | whiteYellow-cup | 100 | 100 |

TABLE 2-continued

| Class | Precision % (F-RCNN) | Precision % (RCNN) | Class | Precision % (F-RCNN) | Precision % (RCNN) |
|---|---|---|---|---|---|
| redBigscissor | 97.6 | 100 | white-cottonBalls | 100 | 100 |
| redBlacksocks | 100 | 100 | white-cup | 100 | 100 |
| redGreenball | 100 | 100 | white-gloves | 100 | 100 |
| redmimobilePhone | 100 | 100 | white-tape | 100 | 100 |
| redPlasticspoons | 98.23 | 100 | woodenbrush | 100 | 100 |
| redWhiteSwipingcloth | 100 | 100 | woolen-cap | 100 | 100 |
| red-bottle | 95.05 | 100 | yellowMagic-tape | 100 | 100 |
| red-feviquik 100 100 | 100 | 100 | yellow-DSTape 100 100 | 100 | 100 |
| restInPracticebook | 97.7 | 100 | yellow-ScrewDriver 100 100 | 100 | 100 |
| roboticsManualbinder | 94.34 | 100 | | | |

Unlike some existing automatic annotation approaches that can annotate only those objects which are already known to the NN models used by the existing methods, the method disclosed herein can address any new object, completely unknown/unseen to the existing system. Moreover, the number of class which the existing methods can handle is fixed, in contrast, the method disclosed herein can handle any number of objects/class, making it a fully automatic annotation approach.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for automatic object annotation using deep network, the method comprising:
   receiving a manually annotated image set with each image comprising a single annotated object on a known background;
   generating a plurality of synthetic single object images by applying an affine transformation and a colour augmentation on each image from the manually annotated image set, wherein the generated plurality of synthetic single object images are annotated automatically in accordance with a corresponding manually annotated image;
   training an annotation model for two class object detection and classification using the synthetically generated single object images and manually annotated single object images to detect a foreground Region Of Interest (ROI) corresponding to the object in an image, wherein the annotation model comprises of a Faster Region-based Convolutional Neural Networks (F-RCNN) and Region-based Fully Convolutional Networks (RFCN);
   analyzing a set of single object test images comprising unknown objects placed on the known background using the trained annotation model to generate a set of annotated images;
   synthetically generating a plurality of clutter images with corresponding annotations using the set of annotated images; and
   utilizing the plurality of clutter images and corresponding annotations for training a multi-class object detection and classification model designed using the RCNN and the RFCN as base networks, wherein the multi-class object detection framework annotates input test image in real time by:
   identifying one or more ROIs corresponding to one or more objects in the input test image and class labels associated with the one or more objects, wherein the input test image is one of an single object input image or a clutter input image, wherein each ROI is defined by a bounding box with position coordinates comprising xmin, ymin, xmax, ymax.

2. The method of claim 1, wherein training the annotation model comprises:
   a first training stage for creating a plurality of region proposals providing a plurality of possible foreground ROIs defined by a plurality of bounding boxes in a test image; and
   a second training stage for identifying the foreground ROI defined by the bounding box among the plurality of possible foreground ROIs.

3. The method of claim 1, wherein generating the plurality of clutter images comprising a plurality objects from the manually annotated image set and the plurality of synthetic single object images comprises:
   for each clutter image to be generated:
   selecting a background image;
   dividing the background image into a plurality of grids;
   cropping the objects from manually annotated image set and the plurality of synthetic single object images using manually generated masks;
   randomly pasting the cropped objects on the plurality of grids; and
   assigning different binary values to the generated masks with for different objects in order to distinctly obtain foreground ROI in each clutter image generated.

4. The method of claim 1, wherein the method further comprises using a multi-resolution multi-camera set up with each camera mounted on a rotating platform for capturing:
   a set of images for generating the manually annotated images;
   a set of test images of unknown objects;
   an input test image for the real time testing; and
   a background image for creating clutter image.

5. A system for automatic object annotation using deep network, comprising:
   a memory storing instructions;
   one or more Input/Output (I/O) interfaces; and
   one or more processors coupled to the memory via the one or more I/O interfaces, wherein the one or more processors are configured by the instructions to:
   receive a manually annotated image set with each image comprising a single annotated object on a known background;
   generate a plurality of synthetic single object images by applying affine transformation and colour augmentation on each image from the manually annotated image set, wherein the generated plurality of synthetic single object images are annotated automatically in accordance with a corresponding manually annotated image;
   train an annotation model for two class object detection and classification using the synthetically generated single object images and manually annotated single object images to detect a foreground Region of Interest (ROI) corresponding to the object in an image, wherein the annotation model comprises of a Faster Region-based Convolutional Neural Networks (F-RCNN) and Region-based Fully Convolutional Networks (RFCN);
   analyze a set of single object test images comprising unknown objects placed on the known background using the trained annotated model to generate a set of annotated images;
   synthetically generate a plurality of clutter images with corresponding annotations using the set of annotated images; and
   utilize the plurality of clutter images and corresponding annotations for training a multi-class object detection and classification model designed using the Region-based Fully Convolutional Networks (RCNN) and the Region-based Fully Convolutional Networks (RFCN) as base networks, wherein the multi-class object detection framework annotates input test image in real time by:
   identifying one or more ROIs corresponding to one or more objects in the input test image and class labels associated with the one or more objects, wherein the input test image is one of an single object input image or a clutter input image, wherein each ROI is defined by a bounding box with position coordinates comprising xmin, ymin, xmax, ymax.

6. The system of claim 5, wherein the one or more processors are configured to train the annotation model based on a:
- a first training stage for creating a plurality of region proposals providing a plurality of possible foreground ROIs defined by a plurality of bounding boxes in a test image; and
- a second training stage for identifying the foreground ROI defined by the bounding box among the plurality of possible foreground ROIs.

7. The system of claim 5, wherein the one or more processors are configured to generate the plurality of clutter images comprising a plurality objects from the manually annotated image set and the plurality of synthetic single object images by:
for each clutter image to be generated:
- selecting a background image;
- dividing the background image into a plurality of grids;
- cropping the objects from manually annotated image set and the plurality of synthetic single object images using manually generated masks;
- randomly pasting the cropped objects on the plurality of grids; and
- assigning different binary values to the generated masks with for different objects in order to distinctly obtain foreground ROI in each clutter image generated.

8. The system of claim 5, wherein the one or more processors are further configured to receive:
- a set of images for generating the manually annotated images;
- a set of test images of unknown objects;
- an input test image for the real time testing; and
- a background image for creating clutter image captured by a multi-resolution multi-camera set up with each camera mounted on a rotating platform.

9. A non-transitory computer readable medium, the non-transitory computer-readable medium stores instructions which, when executed by a hardware processor, cause the hardware processor to perform actions comprising:
- receiving a manually annotated image set with each image comprising a single annotated object on a known background;
- generating a plurality of synthetic single object images by applying an affine transformation and a colour augmentation on each image from the manually annotated image set, wherein the generated plurality of synthetic single object images are annotated automatically in accordance with a corresponding manually annotated image;
- training an annotation model for two class object detection and classification using the synthetically generated single object images and manually annotated single object images to detect a foreground Region Of Interest (ROI) corresponding to the object in an image, wherein the annotation model comprises of a Faster Region-based Convolutional Neural Networks (F-RCNN) and Region-based Fully Convolutional Networks (RFCN);
- analyzing a set of single object test images comprising unknown objects placed on the known background using the trained annotation model to generate a set of annotated images;
- synthetically generating a plurality of clutter images with corresponding annotations using the set of annotated images; and
- utilizing the plurality of clutter images and corresponding annotations for training a multi-class object detection and classification model designed using the RCNN and the RFCN as base networks, wherein the multi-class object detection framework annotates input test image in real time by:
- identifying one or more ROIs corresponding to one or more objects in the input test image and class labels associated with the one or more objects, wherein the input test image is one of an single object input image or a clutter input image, wherein each ROI is defined by a bounding box with position coordinates comprising xmin, ymin, xmax, ymax.

10. The non-transitory computer readable medium of claim 9, further comprising training the annotation model by:
- a first training stage for creating a plurality of region proposals providing a plurality of possible foreground ROIs defined by a plurality of bounding boxes in a test image; and
- a second training stage for identifying the foreground ROI defined by the bounding box among the plurality of possible foreground ROIs.

11. The non-transitory computer readable medium of claim 9, further comprising generating the plurality of clutter images comprising a plurality objects from the manually annotated image set and the plurality of synthetic single object images by:
for each clutter image to be generated:
- selecting a background image;
- dividing the background image into a plurality of grids;
- cropping the objects from manually annotated image set and the plurality of synthetic single object images using manually generated masks;
- randomly pasting the cropped objects on the plurality of grids; and
- assigning different binary values to the generated masks with for different objects in order to distinctly obtain foreground ROI in each clutter image generated.

12. The non-transitory computer readable medium of claim 9, further comprising using a multi-resolution multi-camera set up with each camera mounted on a rotating platform for capturing:
- a set of images for generating the manually annotated images;
- a set of test images of unknown objects;
- an input test image for the real time testing; and
- a background image for creating clutter image.

* * * * *